Dec. 15, 1953 J. A. GOOD 2,662,985
RADIATION-ABSORPTION TYPE LIQUID LEVEL INDICATOR
Filed Sept. 24, 1948 2 Sheets-Sheet 2
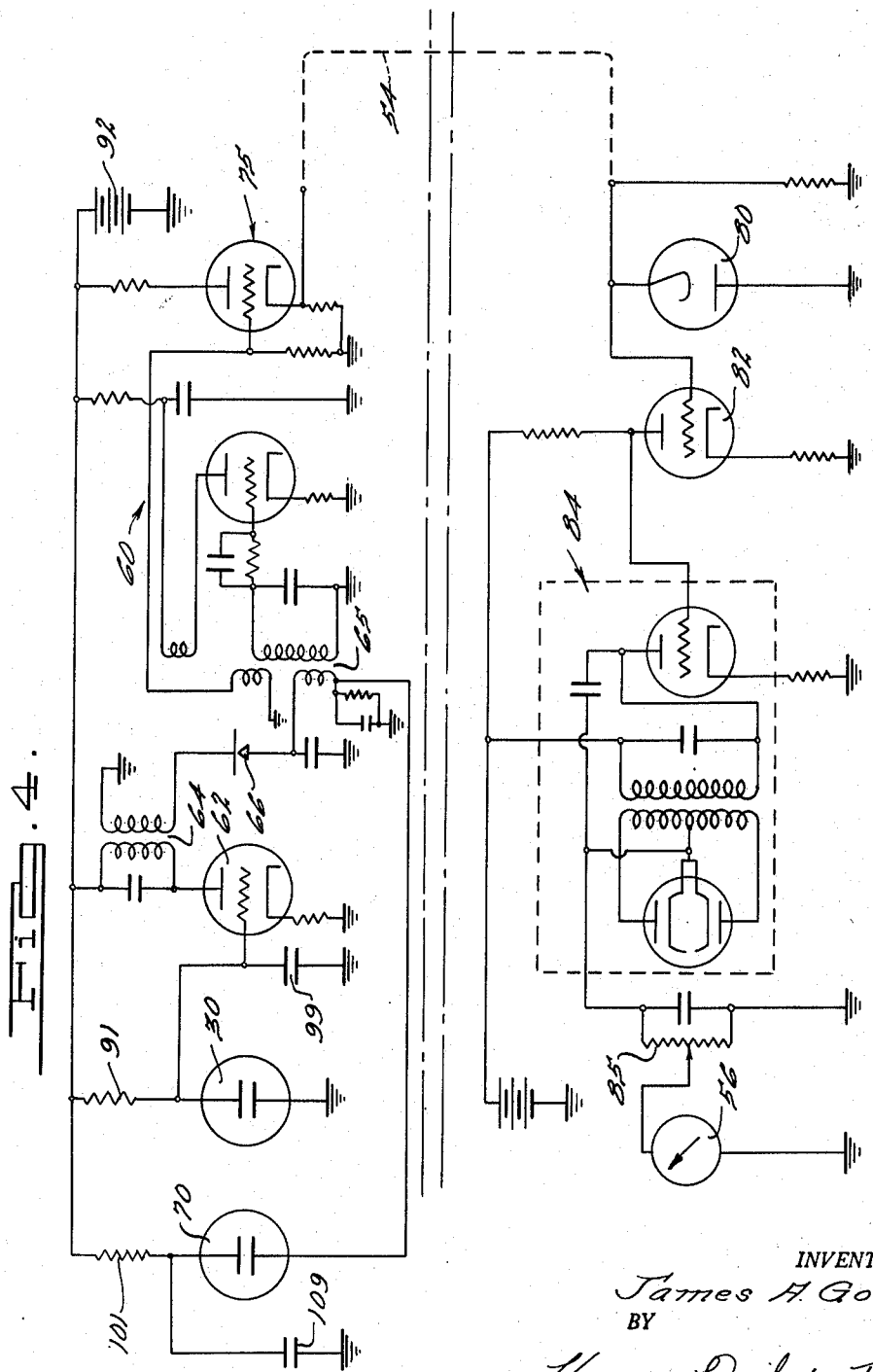
INVENTOR.
James A. Good.
BY
Harness, Dickey & Pierce.
ATTORNEYS.

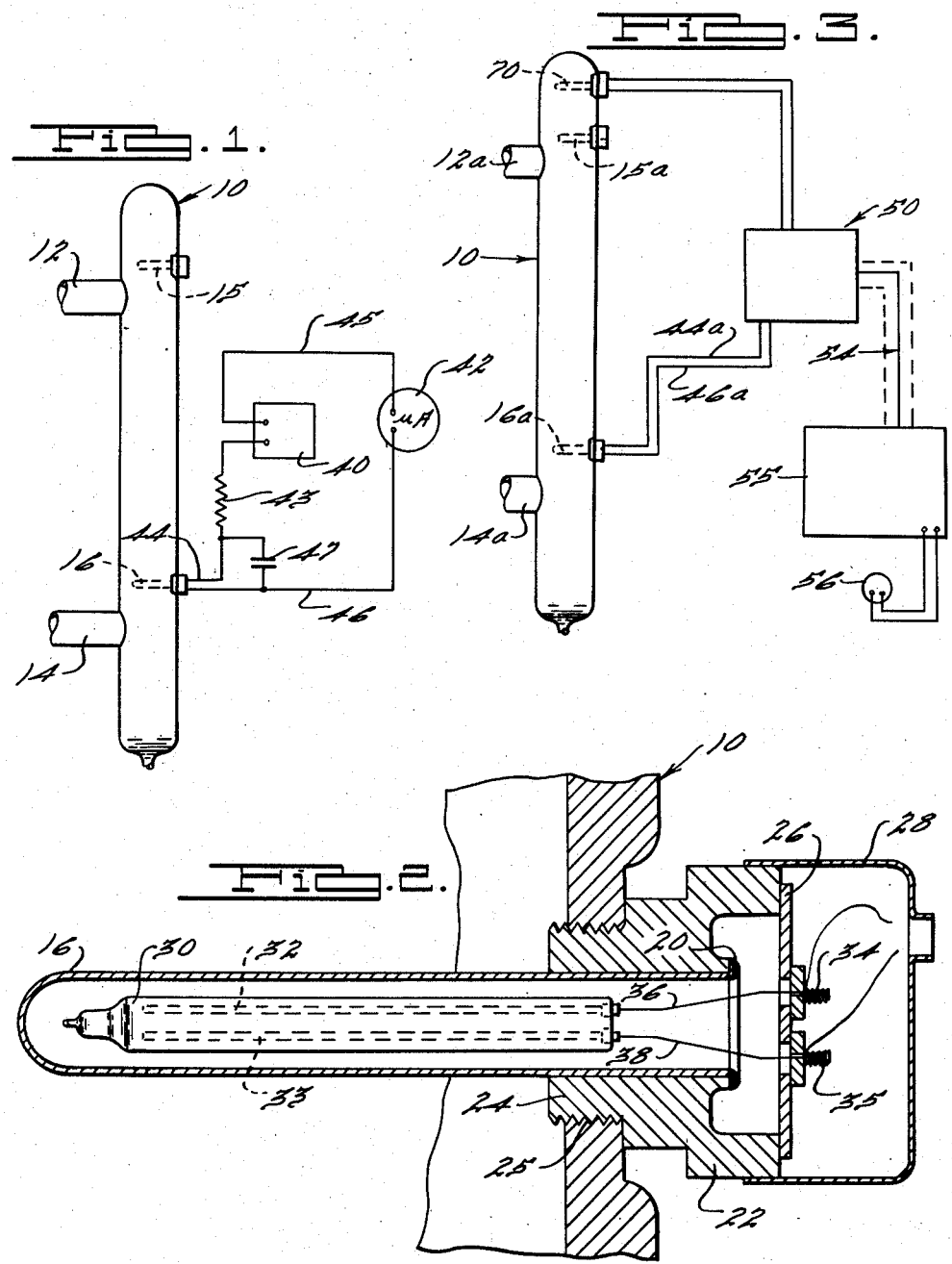
Dec. 15, 1953   J. A. GOOD   2,662,985
RADIATION-ABSORPTION TYPE LIQUID LEVEL INDICATOR
Filed Sept. 24, 1948   2 Sheets-Sheet 1
INVENTOR.
James A. Good.
BY
Harness, Dickey & Pierce
ATTORNEYS.

Patented Dec. 15, 1953

2,662,985

UNITED STATES PATENT OFFICE 2,662,985

RADIATION-ABSORPTION TYPE LIQUID LEVEL INDICATOR

James A. Good, Grosse Pointe, Mich., assignor to Diamond Power Specialty Corporation, a corporation of Ohio Application September 24, 1948, Serial No. 50,908

1 Claim. (Cl. 250—43.5)

The present invention relates to apparatus for indicating liquid level and particularly to an improved telegage construction adapted to furnish at a remote observing or recording station, or at several such stations simultaneously if desired, an accurate and continuous indication of the level of liquid, such as the water in a boiler or other receptacle containing a liquid, the level of which is to be indicated.

An important object of the invention is to provide an improved liquid level indicating system incorporating a signal generating and transmitting station which includes a source of radiation and a radiation-sensitive target element spacedly arranged within the receptacle one above and the other below the normal or intended liquid level range therein, the radiation being of a character which is measureably absorbed, blocked or diverted by the liquid to be gaged, and means being provided for gaging the response of the target element to the radiation which penetrates any liquid that may be present in the area between the source of radiation and the target element. Since the penetrability of the liquid is a function of its level, in such an arrangement metering devices may be provided calibrated to designate directly the level of the liquid.

Another object is to provide such a telegage system utilizing a source of subatomic radiation and one or more target elements comprising ionization chambers within which ionization is induced by such radiation, the arrangement being such that the radiation is required to pass through the liquid-containing space before reaching the ionization chambers, whereby the blocking effect of any liquid contained in such space may, in proportion to the amount of such liquid present, reduce the extent of ionization induced in the ionization chambers, electrical means being provided for conducting to and indicating at a remote point a representation as to the rate of such ionization in terms of liquid level.

Another object is to provide such a radiation-type electronic liquid level telegage of extremely simple and reliable construction and operation, which furnishes a direct, accurate and continuous reading of liquid level, the reading being changeable instantaneously with changes of level and the system being such that it requires no adjustment, manipulation, or knowledge of the functioning of the electronic components on the part of the operator. Still another object is to incorporate in such an electronic telegage of the permeability-type improved compensating means for preventing inaccurate readings due to variances of vapor pressure in the area above the liquid level. Other objects and advantages will be apparent upon consideration of the present disclosure in its entirety.

In the drawings:

Figure 1 is a schematic representation of a water column of a type employed in conjunction with steam boilers, diagrammatically showing the arrangement of the principal components of a level indicating system constructed and arranged in accordance with the principles of the present invention;

Fig. 2 is a longitudinal sectional view of a target element and adjacent portions of the water column in which it is installed;

Fig. 3 is a block-type diagram of a preferred telegage system constructed in accordance with the present invention; and Fig. 4 is a schematic wiring diagram of the system of Fig. 3.

Referring now to the drawing, reference character 10 designates generally a water column which may be of the usual or any desired construction and which is adapted to be connected as by pipes 12, 14 to the steam and water containing portions, respectively, of a steam boiler (not shown) so that the water level in the water column will correspond to that in the boiler.

As is well known, various gaging devices have been employed in conjunction with such water columns to afford visual indication as to the level of water therein. The most common type of gage for this purpose is in the form of a sight glass within which the water level is directly observable. The distance at which the later level may be perceived where ordinary sight glasses are employed is of course limited, and since with large modern boilers it is necessary that the water level be known at a control station which may be located a distance of several hundred feet from the water column, various telegage systems have been developed for transmitting to the control station a continuous indication of the water level obtaining in the boiler.

The present system utilizes the permeability of the liquid with respect to radiation of subatomic character as a determinant of liquid level, and preferably also incorporates electronic transmission means for conveying the determination of level to a remote point.

In carrying out the invention, a small quantity of a radioactive substance, which may conveniently comprise a material such as nickel, which has been rendered radioactive by exposure to emanations from radium salts, or one of the other radioactive higher earth metals, is incorporated in a cartridge as 15 fixedly mounted within the water column at a point somewhat above the highest intended water level therein. Also within the water column, but below the lowest intended water level therein, is a radiation target unit carried in a casing 16. The casing 16 of the target unit is formed as a tube closed at its inner end which projects into the water column 10, its other outer end projecting through the water column wall and being open. The casing tube 16 may be formed of steel, and its open end is provided with an out-turned lip flange secured as by welding at 20 to a supporting bushing 22 through which the casing tube projects. Bushing 22 is provided with a threaded supporting portion 24 adapted to be tightly screwed into a suitably tapped opening as 25 in the wall of the water column 10. The open outer end of the tube 16 may be covered by an insulating panel 26 over which a cover 28 is fitted.

Within the casing tube 16 is a tubular glass envelope 30, preferably formed of heat resistant glass defining a target cell within which are a pair of spaced electrodes 32, 33. The atmosphere within the cell envelope 30 consists of an inert gas such as argon. The electrodes 32, 33 are connected as by conductors 36, 38 respectively to suitable electrical terminals as 34, 35 mounted on the panel 26.

As shown in Fig. 1, the target cell may be connected in series with a source of high voltage direct current of constant potential, diagrammatically presented by the power pack 40, and with the micro-ammeter 42, the cell being connected to the power pack through a resistor 43 by a conductor 44 and being connected to the micro-ammeter by a conductor 46. The power pack and micro-ammeter are connected to one another by a conductor 45. A capacitor 47 is shunted across the target chamber electrodes.

It is believed that the operation of the system shown in Fig. 1 will be apparent from the foregoing, but it may briefly be summarized as follows. With the liquid level at a minimum value, the rate of ionization in the target cell 30 will be at a maximum value. Each time the cell fires it discharges the capacitor 47. The circuit includes enough resistance, represented by the resistor 43, so that the cell will not be maintained in the break-down condition but will be extinguished when the potential drops due to the discharge of the capacitor 47. The ionizing effect of the radiation upon the cell 30 represents in effect a charging source which augments the charge derived from source 40, so that the more rapidly the rate of ionization in cell 30 the more rapid is the rate of pulsating discharge of the system. The charge builds up more rapidly with higher ionization rates, and the rate of current flow through the circuit which includes the meter 42 will be conformably high. At lower ionization rates the pulsating current in the meter circuit will be conformably reduced. The pulse frequency of the system is high enough throughout the entire range of operation so that the needle of the meter cannot respond to the individual pulses, and due to inertia the meter accordingly only indicates an average or root mean square of the current value as the case may be, although of course the dial of the meter is preferably calibrated directly in terms of liquid level. It will be understood that as the level increases toward the radiating cartridge 15, the ionization rate in the target cell is gradually reduced, and the micro-ammeter is so calibrated that the deflection of the needle is indicative of and proportional to the change in level. The indication furnished by the meter thus represents the liquid level obtaining at all times.

Where it is desired to transmit the level reading for a substantial distance, means may be employed to increase the voltage output, and the system is also preferably so arranged as to render the readings independent of voltage fluctuations and independent of the distance between the transmitting and receiving parts of the system. In addition the system may incorporate means for offsetting the effects of variations of vapor pressure. The arrangement of such a system is shown in block diagram form in Fig. 3. As there indicated, the target cell 16A is connected as by means of conductors 44A, 46A to the input of an oscillator and amplifier assembly generally designated 50, which is preferably in the form of a frequency modulated or pulsing system of a type wherein variations on input signal derived from variations in the rate of ionization of the target cell cause corresponding variations in the output frequency or pulse rate of the oscillator. The modulated characteristics of the oscillator output, delivered to the transmission line 54, are accordingly independent of the output voltage. The transmission line 54 is connected to the input of a receiver 55, which may comprise a conventional demodulator or discriminator and detector system, the output of the receiver incorporating a suitable indicating device such as the plate current milliammeter 56, which may be calibrated in water level.

If a pulsing oscillator is used, the frequency of the pulses generated by the oscillator is of course sufficiently high so that the inertia of the moving parts of the milliammeter is too great to permit the meter to respond to individual pulses, so that the meter will respond only to the average value or root mean square value of the current in the anode circuit of the receiver output, which value will depend upon the frequency of the pulses and the resultant average duration of current flow pulse periods in such output circuit.

In the preferred arrangement shown in Fig. 4, the target ionization chamber 30 contained in casing 16A controls the action of an FM oscillator, generally designated 60. The target cell 30 is arranged to modify the charging rate of a capacitor 99, the main charge for which is derived from a D. C. source 92 through a resistor 91. A pulsating signal is thus fed to the grid of a preamplifier tube 62 which serves to isolate the target cell from the oscillator circuit. The output of the amplifier tube 62 is delivered through an output transformer 64 to the input transformer 65 of the oscillator. A cold rectifier 66 of any suitable variety is incorporated in the secondary circuit of the output transformer 64.

The positive bias on the grid of the tube 62 is higher as the charge builds up between the discharging phases of cell 30. When the cell fires, the grid bias of tube 62 drops and the output of the tube falls. Thus when the water level is high and the ionization rate in the cell 30 is accordingly at a minimum, the system is slower to build up to the triggering voltage of cell 30 and in effect the discharging phases of the cell are relatively shorter so that the average or overall positive bias applied to the grid of tube 62 throughout a succession of cycles is higher and tube 62 delivers a correspondingly high output.

The output frequency of the oscillation generator 60 is accordingly at a maximum. As the water level falls the ionization rate of the target cell increases proportionately. Such increase of ionization rate increases the rate of current drain through the cell and in effect drops the voltage of the control grid of the tube 62. The output of the tube 62 and of the oscillator 60 fall in proportion to such drop. It will be perceived that changes of effective positive bias and the conforming changes of the output frequency of the oscillator 60 bear a predetermined relationship to the water level, with the system arranged in this fashion, and that when a frequency modulated oscillator is employed, in the manner disclosed, the frequency output rises and falls in proportion to the water level.

In a portion of the water column 10 above the radiating cartridge 15A and also above the normal liquid level, another ionization chamber is incorporated, and is shown in the form of a compensating target cell 70. The rate of ionization of the gas in cell 70 is variable with and in proportion of the permeability of the vapor in the space above the liquid level in the water column, and it will be appreciated that the rate of ionization in tube 70 is therefore a function of the gas density or vapor pressure in such space. The output of the compensating tube 70 is connected to the opposite side of the primary winding of the oscillator input transformer 65 from the side to which the output of tube 62 is connected, and a voltage from source 92 is applied to the other side of cell 70 and to a capacitor 109 through a resistor 101. When the ionization rate of compensating cell 70 is increased, its effect is to deliver an increased pulsating discharge to the oscillator input transformer 65, and vice-versa. When the vapor pressure is high the ionization rate in cell 70 decreases, decreasing the effective signal voltage fed to the oscillator, while when the vapor pressure is low the ionization rate is similarly increased. The circuit components are so selected and adjusted that the decreased signal delivered to the oscillator as the result of such an increase in vapor pressure is sufficient to decrease the overall signal voltage input to the oscillator sufficiently to offset any tendency of the target cell and amplifier system comprising the tubes 16A, 62 to furnish an unduly high water level reading on account of such increased vapor pressure. Likewise a drop of vapor pressure which might cause the target cell system to impress a signal on the oscillator corresponding to an improperly low water level is offset by the tendency of the drop in vapor pressure to produce an increasing signal output from compensating cell 70.

The output frequency of the oscillator system 60 is fed to the transmission line 54 through an amplifier, generally designated 75, and it will be appreciated that transmission line losses or other factors may vary the amplitude of the output signal carried by the transmission line, but will not change the frequency modulated characteristics thereof.

The receiver located at the observing station may consist of standard components arranged as shown in the lower section of the diagram of Fig. 4, and may include a diode feeding tube 80, a clipper tube 82 to which the output of the feeding tube is supplied and which produces an input signal of constant potential regardless of the strength of the received signal, a discriminator circuit including discriminator tube 84, and a duo-diode detector tube 95, the amplitude-modulated output of which is fed to an indicating or recording device, shown as a plate current milliammeter 56.

The milliammeter indicating device may be calibrated in water level and is shown as connected to the detector output circuit through a potentiometer 85 which permits adjustment of the reading of the meter, but it will be understood that the potentiometer adjusting means is preferably so positioned that it is not readily accessible to the users of the system, being normally employed only in the initial balancing of the system.

In the event of any failure or defect of a part, which would cause a reduced output, the milliammeter indicator 56 will show a low water reading, corresponding to a warning, so that there is literally no danger that my improved system would fail to indicate either a low water level condition or a defect in the system itself.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claim.

What is claimed is:

In combination with a liquid-containing vessel within which liquid normally stands at an intermediate level, a liquid level gage comprising a radiator of sub-atomic energy, a signal generator including an ionization chamber, said radiator and ionization chamber being arranged at different elevations in the liquid-containing vessel corresponding to positions above and below the normal liquid level therein, and with the chamber positioned within the field of radiation emanating from the radiator, an infinitely variable indicator responsive to the rate of ionization in said chamber wherein the radiator is arranged above the normal liquid level in said vessel and the chamber below such level, an electronic oscillator having an input portion operatively coupled to the signal generator, said oscillator being arranged to generate an infinitely variable output signal proportional to the rate of ionization in said chamber, means for delivering such output signal to the indicator, and a compensating ionization chamber also arranged above the normal liquid level in said vessel and within the radiation field of the radiator, whereby changes of vapor pressure in the vessel above the liquid therein may influence the rate of ionization in the compensating chamber, said compensating chamber also being operatively coupled to the oscillator to modify the output thereof in response to variances of vapor pressure.

JAMES A. GOOD.

References Cited in the file of this patent

UNITED STATES PATENTS

| Number | Name | Date |
|---|---|---|
| 1,208,830 | Pratt | Dec. 19, 1916 |
| 2,316,239 | Hare | Apr. 13, 1943 |
| 2,412,575 | Frosch | Dec. 17, 1946 |
| 2,456,233 | Wolf | Dec. 14, 1948 |
| 2,506,585 | Elliott | May 9, 1950 |